June 30, 1942. R. J. STACK 2,288,426
FILTER MATERIAL
Filed Oct. 30, 1939
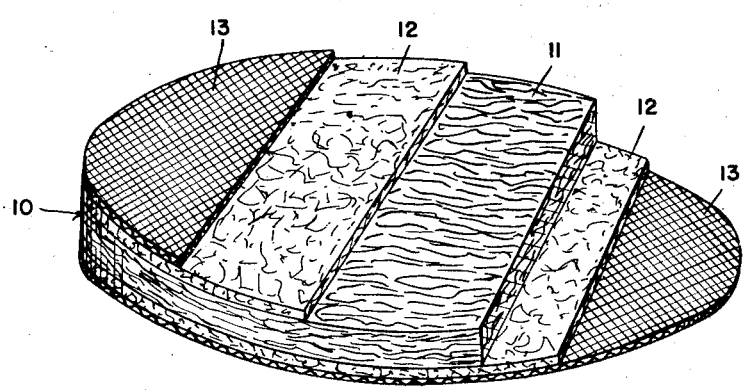
INVENTOR.
ROBERT J. STACK
BY Whittemore, Hulbert
& Belknap ATTORNEYS Patented June 30, 1942

2,288,426

UNITED STATES PATENT OFFICE 2,288,426

FILTER MATERIAL

Robert J. Stack, Waterford, N. Y., assignor to National Automotive Fibres, Inc., Detroit, Mich., a corporation of Delaware Application October 30, 1939, Serial No. 302,044

9 Claims. (Cl. 210—204)

The present invention relates to filter material and more particularly to a filter disc for filtering raw milk.

At the present time many States require the filtration of milk, and even where such requirement is not made, it is almost universal practice to filter the raw milk immediately after it has been obtained from the cow.

A number of different types of filters are at present on the market for this purpose, but by far the most commonly used comprises essentially a thin ply of loosely aggregated bleached cotton. The filter discs employed must, of course, remove the dirt and sediment in a satisfactory manner. Other than this, a desirable quality is strength of the material so as to avoid rupture during use, which would cause the accumulated dirt and sediment to be washed into the already filtered milk. Two of the most important characteristics to be desired in a filter disc are speed of filtration and resistance to clogging.

I have devised a filter disc of a new construction and material which fulfills all of the requirements of milk filter discs. The material is strongly resistant to rupture, may be used for long periods without clogging, and exhibits the surprising characteristic of performing the filtering operation in a small fraction of the time at present required by known filter discs. Tests have demonstrated that my improved filter discs perform the same operation as present known types in as little as one-fifth of the time, and this great increase in speed is not gained at the sacrifice of completeness of filtration and percentage of sediment removed.

It is an object of the present invention to provide a filter material composed primarily of a main filter body of artificially produced, relatively straight fibers.

It is a further object of the present invention to provide a milk filter disc having a main body composed essentially of an artificially produced cellulosic fiber which is relatively straight, of substantial length, and of a diameter preferably not less than .0010 of an inch.

It is a further object of the present invention to provide a filter of the type referred to in which the main filter body has provided at its opposite surfaces relatively thin reinforcing plies of a relatively fine kinky fiber, such as cotton, and which is preferably further provided with one or more reinforcing layers of sheeting, such for example as tobacco cloth or the like.

The figure is a perspective view on a much exaggerated scale with the elements of the filter disc broken away to disclose its construction.

According to the present invention the filter which is indicated generally at 10 has a main filter body 11 formed of an artificially produced fiber, preferably of a cellulosic material, such for example as regenerated cellulose of the type on the market under the trade name of "rayon." This main filtering body is quite thin, the fibrous material including this body weighing about one and one-half pounds to twelve square yards. The proportion of the artificially produced fibers to the other fibers, later to be referred to, will be defined later. Preferably the artificially produced fibrous material is characterized by relatively straight fibers as opposed to the naturally kinky fibers of cotton. In addition the fibers are of a diameter substantially larger than cotton fibers, and I have found that excellent results are obtained when the artificially produced fibers have a diameter of about .0014 inch. The diameter of the fibers, of course, may be varied from this exact dimension a considerable amount, but in general I prefer to employ fibers having a diameter greater than .0010 inch. An upper limit will be reached when the fibers are of a size such as to cause incomplete and unsatisfactory filtering of the milk.

Further I prefer that these fibers shall be of substantial length. In one sample which I have caused to be tested the fibers will average about two inches in length. It will be obvious, of course, that the fibers need not be of this exact dimension, and in fact normally the fibers will vary considerably in length. However, I prefer to employ fibers averaging over one inch in length.

The fibers which make up the main body of the filter material are preferably arranged in general parallelism. Satisfactory results are obtained in carding the fibrous material onto a moving conveyor. For this purpose I prefer to employ a battery of carding machines so that the fibrous material will be deposited on the conveyor in a plurality of plies. As will be readily understood, this results in the formation of a main filter body in which the fibers are arranged in general parallelism. They are not, of course, arranged in absolute parallelism, and there is a considerable amount of overlap and interlinkage of the fibers. This overlap and interlinkage is substantially less than obtains where a similar material is formed by carding natural cotton.

This main body of filter material has the qualities of removing practically all of the dirt and sediment from milk, and at the same time performs this operation in a small fraction of the time required by filter material previously known to the art.

In order to provide a measure of reinforcement for these carded artificially produced fibers, I prefer to provide a coating or ply of relatively fine kinky fibers, such for example as cotton, at each surface of the main body of filter material. These are illustrated in the figure at 12 and may conveniently take the form of natural cotton carded as described in connection with the artificially produced fibers going to make up the main filter body 11. In practice I find that the filter material may be readily and satisfactorily produced by providing a battery of carding machines in series adjacent a single moving conveyor. The first and last of this battery of carding machines may be supplied with plies of cotton and the intermediate carding machines may be supplied with the artificially produced fibers, such for example as rayon. I have obtained excellent results by employing a battery of ten carding machines, the first and last of which are supplied with cotton and the intermediate eight of which are supplied with rayon.

It is noteworthy that all of the fibers going to make up the main filter body 11, as well as the reinforcing fibers 12, are arranged in general parallelism. However, in some cases it may be preferable to arrange the fibers of cotton in the surfaces of the main filter body 11 in a direction transverse to and in some instances perpendicular to the direction of the fibers of the main filter body 11.

The product as thus far described is an efficient filter, but in order to reinforce the same it is preferred to provide further treatments. These treatments comprise sizing the outer surfaces of the cotton plies with a suitable sizing material, such for example as starch. This starch is of course dissolved during the filtering operation but facilitates prior handling of the filter material without injury. I also prefer to provide an outer reinforcing sheeting 13 of an open-work fabric. This sheeting may conveniently take the form of tobacco cloth. The sheeting material is of very open mesh and serves primarily in reinforcing the fibrous filter material. Excellent results are obtained when this woven reinforcing sheeting is supplied at one side only of the filter material, but in some instances it is desirable to provide the sheeting at both sides.

I have caused tests to be made on my improved filter material, and it has proven to be distinctly and surprisingly superior to similar filter materials composed basically of cotton fibers. Sediment removal in my improved filter material is equal to the best obtained by prior products, and as indicated the time required to filter a given quantity of milk is a small fraction of that previously required. Specifically, my improved filter in official tests filtered one can of fresh milk cooled to 85° F. in twenty-eight seconds. In a second trial the filter material strained the first can of milk in forty seconds and a second can in thirty-five seconds. A third test was made with three cans of milk; the filter material strained the first can of milk in thirty-five seconds; the second can in thirty-two seconds; and the third can in thirty-six seconds. In this last test the filter was still running at full speed at the end of the third can, and sediment removal was excellent throughout.

This was a comparative test, and one of the best known standard cotton filters now on the market required three minutes and twenty seconds for straining one can under the same conditions. Sediment removal in this case was good but no better than was obtained by employing my improved filter discs.

It has long been realized, of course, that speed of filtration could be substantially increased, but so far as I am aware this has previously been thought possible only at the sacrifice of efficiency in sediment removal. My improved filter discs increased the speed of filtration five or six times without apparently in any way reducing the efficiency of filtration. These surprising and unexpected results may perhaps be explained by the fact that the fibrous material which I employ has fibers which are relatively straight and which do not kink and interlock to the same extent as cotton fibers previously used. Apparently this materially increases the rate of filtration without sacrificing the efficiency of the disc. Furthermore, the fibers are of somewhat larger size than cotton fibers, which would be expected to increase the rate of filtration but with a corresponding decrease in efficiency. As previously indicated, no such corresponding decrease of sediment removal is found; the fibers being of substantial length undoubtedly facilitates their arrangement in substantially parallelism and also increases the efficiency of the improved filter. The provision of a plurality of relatively straight, relatively long, relatively large fibers in substantially parallelism provides a multiplicity of definite paths for the liquid to follow through the strainer, and at the same time provides for sediment removal along these paths.

The main filter body in which the artificially produced fibers such as rayon are applied, as previously described in substantially parallelism, has little mechanical strength and would be subject to rupture in handling or use. I find that the provision of light plies of cotton at the outer surfaces thereof provides for considerable reinforcement, and presumably these plies not only provide outer plies which are themselves of fair mechanical strength but which also serve to interlock to some extent the intermediate artificially produced fibers.

These outer plies of relatively fine, kinky fibers, such for example as cotton, are preferably as thin as is consistent with the strength requirement of the completed product. I have found that excellent results are obtained where each surfacing ply of kinky fibrous material has a ratio to the main filter body of not more than 1 to 10. Excellent results were obtained where the outer relatively fine, kinky fibrous material was present on both sides of the main filter body, and amounted together to about 15% by weight of the total fibrous material.

As above stated, the chief purpose of the fine, kinky fiber is to reinforce the relatively coarse, straight fiber. Accordingly, instead of providing distinct, outer plies of the material, it is possible to provide it as a mixture throughout the coarse fibers. It is desirable of course to use a minimum of the fine, reinforcing fiber, and by a proper mixing of the two, the same reinforcing effect may be obtained with a lesser amount of reinforcing, or interlocking fibers.

In this instance the two fibrous materials may be mixed by any convenient means, and then carded as before.

I have referred in the foregoing to artificially produced fibers, and by these I mean to include organic fibers such for example as regenerated cellulose, cellulose acetate, or other cellulosic fibers. In addition, other artificially produced organic fibers will be satisfactory. At the present time I am not aware of any natural fibers which fulfill the requirements I have found necessary, but if such natural fibers are discovered they should of course fall within the scope of the present invention. Artificially produced fibers of spun glass and the like are not suitable for the present filter for the reason that these fibers are to some degree brittle, and, as is obvious, would be dangerous in a milk filter.

In the foregoing I have referred to the possible explanation for the surprising and unexpected results obtained by the present filter, but I do not wish to be bound by these explanations. I have established as a fact that the filter made in accordance with the foregoing description possesses certain properties which have been set forth, irrespective of whatever theoretical explanation may be made as to the reasons for these properties.

While I have illustrated and described several specific embodiments of my invention, it will be apparent to those skilled in the art that various additions, modifications, omissions, combinations and substitutions may be made which will be within the spirit and scope of my invention as defined by the appended claims.

What I claim as my invention is:

1. A milk filter sheet having a main filter body composed essentially of uniform, substantially straight, generally parallel, artificially produced, organic fibers, said fibers being generally parallel to the plane of said sheet, said fibers having an average length of at least one inch, and an average diameter of at least .0010 inch, and separate reinforcing means retaining said fibers in position.

2. A milk filter sheet having a main filter body composed essentially of uniform, substantially straight, generally parallel, artificially produced, organic fibers, said fibers being generally parallel to the plane of said sheet, said fibers having an average length of about two inches, and an average diameter of at least .0010 inch, and separate reinforcing means retaining said fibers in position.

3. A milk filter sheet having a main filter body composed essentially of uniform, substantially straight, generally parallel, artificially produced, organic fibers, said fibers being generally parallel to the plane of said sheet, said fibers having an average length of at least one inch, and an average diameter of about .0014 inch, and separate reinforcing means retaining said fibers in position.

4. A milk filter sheet having a main filter body composed essentially of uniform, substantially straight, generally parallel, artificially produced, organic fibers, said fibers being generally parallel to the plane of said sheet, said fibers having an average length of about two inches, and an average diameter of about .0014 inch, and separate reinforcing means retaining said fibers in position.

5. A milk filter sheet having a main filter body composed essentially of uniform, substantially straight, generally parallel, artificially produced, organic fibers, said fibers being generally parallel to the plane of said sheet, said fibers having an average length of at least one inch, and an average diameter of at least .0010 inch, and separate reinforcing means retaining said fibers in position, said reinforcing means comprising a film of carded cotton fibers at one surface of said main body.

6. A milk filter sheet having a main filter body composed essentially of uniform, substantially straight, generally parallel, artificially produced rayon fibers, said fibers being generally parallel to the plane of said sheet, said fibers having an average length of at least one inch, and an average diameter of at least .0010 inch, and separate reinforcing means retaining said fibers in position.

7. A milk filter having a substantially flat filter body composed essentially of substantially straight, generally parallel, artificially produced, organic fibers, said fibers being generally parallel to the plane of said body, said fibers having a diameter averaging at least .0010 of an inch and averaging at least one inch in length, and means retaining said fibers in position including means for reinforcing said body.

8. A laminated filter of the class described comprising a main layer composed essentially of substantially straight, generally parallel, artificially produced, organic fibers having a diameter averaging at least .0010 of an inch and averaging at least one inch in length, said fibers being arranged generally parallel to the plane of said layer, auxiliary layers of relatively fine, kinky fibers disposed in surface to surface relation with opposite surfaces of the main layer, and protecting layers of open mesh fabric disposed in surface to surface relation with the outer surfaces of said auxiliary layers, and means bonding the respective layers together.

9. A laminated filter of the class described comprising a number of layers arranged one on top of the other in surface to surface relation and bonded together, one of said layers being composed essentially of substantially straight, generally parallel, artificially produced, organic fibers, having a diameter averaging at least .0010 of an inch and averaging at least one inch in length, said fibers being arranged generally parallel to the plane of said layer, another of said layers being composed of relatively fine, kinky fibers, portions of the fibers of the second mentioned layer interlocking with portions of the fibers of the first mentioned layer, another of said layers being an open mesh fabric sheet.

ROBERT J. STACK.